May 25, 1937.  W. JANOVSKY  2,081,748
METHOD OF MEASURING MECHANICAL FORCES
Original Filed June 26, 1933

Inventor:
Wilhelm Janovsky
by Louka & Kehlenbeck
Attorneys.

Patented May 25, 1937

2,081,748

UNITED STATES PATENT OFFICE 2,081,748

METHOD OF MEASURING MECHANICAL FORCES

Wilhelm Janovsky, Berlin-Spandau, Germany, assignor to Siemens & Halske Aktiengesellschaft, Berlin-Siemensstadt, Germany, a corporation of Germany Original application June 26, 1933, Serial No. 677,705. Divided and this application November 21, 1935, Serial No. 50,835. In Germany November 26, 1932

3 Claims. (Cl. 177—351)

The present application is a division of my pending application filed in the United States Patent Office on June 26, 1933, Serial No. 677,705, which has matured into Letters Patent No. 2,053,560 of September 8, 1936.

This invention relates to an improvement in the so-called magneto-elastic method of measuring mechanical forces. In such method, a body of magnetizable material is magnetized by means of an exciting coil connected to a source of alternating current, said body being also at the same time subjected in its entirety or in certain parts, to the forces to be measured. The strain produced by the said forces affects the permeance of the material under test and thereby also changes the impedance of the exciting coil. It follows that the magnitude of the forces to be measured can be determined by measuring the impedance of the exciting coil with the aid of an electrical measuring device. I have found that it is advantageous to employ a magnetization exceeding the degree used previous to my invention, and particularly to employ, for magnetizing the body under test, an alternating current of such character that the magnetization will exceed the limit given by the coercive force of the material of said body.

Figure 1:
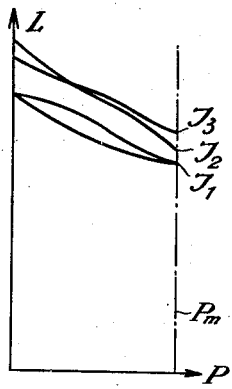
Figure 2:
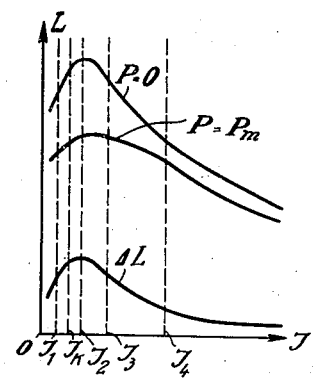
Figure 3:
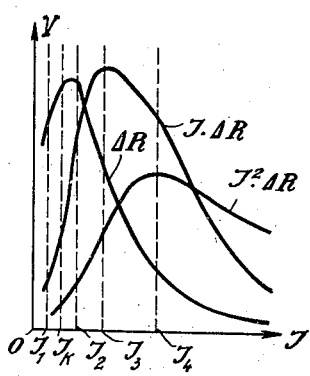
Figure 4:
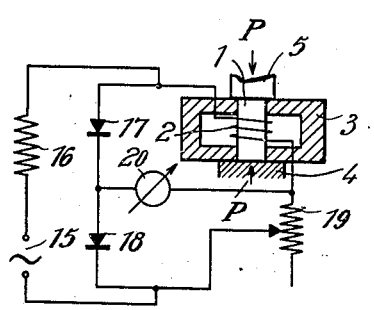

Reference is to be had to the accompanying drawing in which Figs. 1, 2, and 3 are diagrams illustrating the electrical and magnetic conditions involved in my invention, and Fig. 4 is a diagrammatic view showing, as an example, one of the circuit arrangements which may be used in carrying out my invention.

Fig. 1 represents the variation in inductivity L of a test body magnetized by different exciting currents $J_1$, $J_2$, $J_3$ under the action of variable mechanical forces P. It will be seen that in all the cases the inductivity decreases as the strain on the test body increases from $P=O$ to $P=P_m$. For the current intensity $J_1$ which is in accordance with the degree of magnetization used up to now, different characteristics are obtained with increasing and decreasing strain, on account of hysteresis phenomena. In practice these phenomena disappear, however, entirely if, according to the invention, the intensity of the exciting current is increased beyond the limit determined by the coercive force of the material. As may be seen from the curves designated by $J_2$ or $J_3$ as corresponding to higher intensities exceeding the limit of the coercive force, measurement results are obtained independently of whether the same measurements are effected with increasing or decreasing forces P.

Fig. 2 shows how the inductivity L varies with increasing exciting current intensity, that is on the one hand in the unstrained condition ($P=O$) and, on the other hand, in the strained condition $P_m$ of the test body. The current intensities $J_1$, $J_2$, $J_3$ in accordance with Fig. 1 are also indicated in Fig. 2 which latter indicates a further current intensity $J_4$, as well as an exciting current intensity $J_k$, corresponding to the coercive force of the material concerned, the relation of these current intensities being $J_1<J_k<J_2<J_3<J_4$. Now, if, in addition, the difference of the values of L is also plotted for $P=O$ and $P=P_m$ respectively, one obtains the curve designated by $\Delta L$, which shows a maximum for a value of the exciting current intensity between $J_k$ and $J_2$.

The difference of the inductive reactance $\Delta R = \omega . \Delta L$ corresponding to $\Delta L$ and showing, of course, a maximum at the same point, had been plotted in Fig. 3. But further consideration shows that the test voltage V available for the measurement, in say a compensation device, corresponds to the product $J.\Delta R$, equally plotted in Fig. 3. It may be recognized from the graph that the peak value of the measuring voltage V lies in the neighborhood of the intensity $J_3$. The curve designated by $J^2.\Delta R$ represents a measure of the corresponding power whose maximum appears to be considerably more shifted in terms of a stronger magnetization.

The graphs show that an exciting current intensity exceeding the value $J_k$ offers the further advantage that the voltage available for the measurement, viz. $J.\Delta R$ is still further increased. It may in some cases even be advantageous to make the exciting current intensity higher than the intensity $J_3$ corresponding to the maximum of $J.\Delta R$, so as to reach the value $J_4$, in order to come into the range of maximum power $J^2.\Delta R$. This will more particularly be advisable, if small forces are to be measured and correspondingly the cross-sectional area of the test body or its volume must be chosen relatively small since, in this case, the available power is also small.

Another important advantage lies in the increased magnetization insofar as, with a suitably chosen exciting current intensity, the variations in the exciting voltage may, to a certain extent, be compensated for. For this end it is preferable to make use of an intensity in the neighborhood of $J_3$, as the curve of the test voltage $J.\Delta R$ shows in this case a maximum and, due to variations in voltage, intensity changes have the least influence on the height of the voltage $J.\Delta R$ corresponding to the force under test.

As has already been mentioned, the permeance of the test body is preferably measured by means of a compensation method, e. g. in the shape of a Wheatstone bridge. The magnitude of the impedance of the exciting winding of the test body is in this case compared with that of a known resistance. It is of special advantage to use a Wheatstone bridge balanced in the unstrained condition of the test body, so as to enable the current flowing through the measuring instrument in the diagonal branch to disappear, the deflection on the measuring instrument being thus a measure of the forces or momenta straining the test body under test.

Fig. 4 schematically shows a D. C.-compensation device. The A. C. source 15 is connected through a series resistance 16 to the branching points of the bridge, in the arms of which there are connected two rectifiers 17 and 18 respectively, the exciting winding 2 of the test body 1 and a suitable adjustable reference resistance 19. At 3 I have indicated a yoke or shell in contact with the test body or core 1. This shell completes the magnetic circuit. A D. C. measuring instrument 20 lies in the diagonal branch of the bridge. The test body or core 1 is preferably made of nickel-iron and carries the exciting winding or coil 2. This body is in contact with a shell 3 which completes the magnetic circuit, said shell consisting for instance of an iron band or wire wrapping or being built up of individual sheets. At 4 I have indicated a suitable support or abutment to engage one end of the test body 1.

The measurement is effected by first adjusting the reference resistance 19 in such a manner as to cause the instrument 20 to give no deflection in the unstrained condition of the test body. In this case, the amount of the resistance 19 is equal to that of the impedance R' of the exciting winding 2 of the test body. If now the test body 1 is strained by the force under test P, for instance through the medium of a pressure member 5, the magnitude of the impedance R' of the exciting winding 2 varies and the instrument 20 gives a deflection corresponding to this variation $\Delta R'$ which may be taken as a measure of the force P under test. Since, for the measurement, the simple magnitudes of the resistances are taken into account, regardless of the phase condition of the voltages, use can be made of a simple ohmic resistance, as a reference resistance, and a special phase compensation can be dispensed with. It must, however, be admitted that, in this case, the instrument lying in the diagonal branch of the bridge is also traversed by an A. C. component. If this is considered to be objectionable, means well known in the art may be used also to balance the phases of the impedances of the exciting winding of the test body and of the reference resistance which are to be compared, so as to enable both the direct current and the alternating current to disappear in the diagonal branch of the measuring device.

Due to the variation in impedance $\Delta R'$ of the exciting winding, the exciting current intensity J in the winding would also vary with constant voltage of the A. C. source, but these variations would be opposed to sign. The product $J.\Delta R'$ responsible for the magnitude of the instrument deflection would thereby be reduced. To avoid this, the bridge should be connected across a series resistance 16 which should be chosen sufficiently high to enable the variable impedance of the exciting winding to become negligible as compared therewith. The exciting current intensity remains therefore approximately constant irrespective of the strain on the test body.

While Fig. 4 illustrates the use of my invention for the measurement of compression strains, it will be understood that I do not restrict myself to this particular application, but that the magnitude of other mechanical forces may be determined by the use of my invention. Various modifications may therefore be made without departing from the nature of my invention as set forth in the appended claims.

I claim:

1. A method of measuring mechanical forces which consists in subjecting a body of magnetizable material to the forces under test, magnetizing said body by passing through an exciting winding, an alternating current of such strength that the magnetization will exceed the limit given by the coercive force of the material of the body subjected to the forces under test, and measuring the impedance of said exciting winding.

2. A method of measuring mechanical forces which consists in subjecting a body of magnetizable material to the forces under test, magnetizing said body by passing through an exciting winding, an alternating current of such strength that the product of the intensity of the current in said exciting winding multiplied by the variation in the reactance of said exciting winding in the strained condition of the body subjected to the forces under test, as compared with the reactance in the unstrained condition of said body, will attain a maximum value, and measuring the impedance of said exciting winding.

3. A method of measuring mechanical forces which consists in subjecting a body of magnetizable material to the forces under test, magnetizing said body by passing through an exciting winding, an alternating current of such strength that the product of the square of the exciting current intensity multiplied by the variation in the reactance of said exciting winding in the strained condition of the body subjected to the forces under test, as compared with the reactance in the unstrained condition of said body, will attain a maximum value, and measuring the impedance of said exciting winding.

WILHELM JANOVSKY.